(12) United States Patent
Utter et al.

(10) Patent No.: US 10,654,413 B2
(45) Date of Patent: *May 19, 2020

(54) VEHICLE SLIDE DETECTION

(71) Applicant: Modular Mining Systems, Inc., Tucson, AZ (US)

(72) Inventors: Christopher J. Utter, Tucson, AZ (US); William M. Casson, Tucson, AZ (US); Edward A. Branscombe, Tucson, AZ (US)

(73) Assignee: MODULAR MINING SYSTEMS, INC., Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/277,778

(22) Filed: Feb. 15, 2019

(65) Prior Publication Data
US 2019/0176697 A1 Jun. 13, 2019

Related U.S. Application Data

(63) Continuation of application No. 15/902,529, filed on Feb. 22, 2018, now Pat. No. 10,315,565.
(Continued)

(51) Int. Cl.
*B60Q 1/00* (2006.01)
*B60Q 9/00* (2006.01)
(Continued)

(52) U.S. Cl.
CPC .............. *B60Q 9/00* (2013.01); *B60Q 1/525* (2013.01); *B60Q 9/008* (2013.01); *B60W 40/06* (2013.01); *B60W 40/064* (2013.01); *G01M 17/06* (2013.01); *G01S 19/14* (2013.01); *G01S 19/39* (2013.01); *G01S 19/51* (2013.01); *G01S 19/53* (2013.01); *G05D 1/00* (2013.01); *G05D 1/0287* (2013.01); *G08B 21/182* (2013.01); *B60W 2520/20* (2013.01); *B60W 2520/26* (2013.01); *G05D 2201/0202* (2013.01);
(Continued)

(58) Field of Classification Search
CPC .......... B60Q 9/00; B60Q 1/525; B60Q 9/008; G01M 17/06; G01S 19/51; G05D 1/0287
See application file for complete search history.

(56) References Cited

U.S. PATENT DOCUMENTS

| | | | | |
|---|---|---|---|---|
| 2011/0241863 A1* | 10/2011 | Ono | ...................... | B60W 40/08 340/439 |
| 2014/0324291 A1* | 10/2014 | Jones | ..................... | E02F 9/2045 701/41 |
| 2018/0012091 A1* | 1/2018 | Ricci | ..................... | A61B 5/1176 |

* cited by examiner

*Primary Examiner* — Phung Nguyen
(74) *Attorney, Agent, or Firm* — Quarles & Brady LLP

(57) ABSTRACT

A system for monitoring vehicle dynamics and detecting adverse events during operation is presented. Position sensors attached to a vehicle are configured to identify a vehicle orientation (heading) as well as the vehicle's direction of travel (trajectory). A system controller connected to these position sensors can detect the difference between these two measurements. When the difference between these two measurements exceeds a safety threshold, it can be an indication of a slip event. A slip event can be caused by compromised traction or stability and may lead to a loss of vehicle control. The system controller can be configured to monitor various vehicle dynamics to detect these slip events. The system controller may be configured to track geolocations of slip events to create a database of historical slip events for determining location-based risk factors and prevention of future events.

20 Claims, 8 Drawing Sheets

Related U.S. Application Data

(60) Provisional application No. 62/462,672, filed on Feb. 23, 2017.

(51) Int. Cl.
| | | |
|---|---|---|
| *G08B 21/18* | (2006.01) | |
| *G01M 17/06* | (2006.01) | |
| *G01S 19/51* | (2010.01) | |
| *B60Q 1/52* | (2006.01) | |
| *G05D 1/02* | (2020.01) | |
| *B60W 40/06* | (2012.01) | |
| *B60W 40/064* | (2012.01) | |
| *G01S 19/53* | (2010.01) | |
| *G01S 19/39* | (2010.01) | |
| *G01S 19/14* | (2010.01) | |
| *G05D 1/00* | (2006.01) | |
| *G08G 1/00* | (2006.01) | |
| *G08G 1/01* | (2006.01) | |

(52) U.S. Cl.
CPC ....... *G08C 2200/00* (2013.01); *G08G 1/0112* (2013.01); *G08G 1/0133* (2013.01); *G08G 1/0141* (2013.01); *G08G 1/20* (2013.01)

ial Patent Application No. 62/462,
VEHICLE SLIDE DETECTION

CROSS-REFERENCE TO RELATED APPLICATIONS

This application is a continuation of U.S. patent application Ser. No. 15/902,529 entitled "VEHICLE SLIDE DETECTION" and filed on Feb. 22, 2018, now U.S. Pat. No. 10,315,565, issued on Jun. 11, 2019, which claims priority to U.S. Provisional Patent Application No. 62/462,672 entitled "VEHICLE SLIDE DETECTION" and filed on Feb. 23, 2017.

FIELD OF THE INVENTION

This disclosure is related to systems and methods for monitoring vehicle dynamics, and specifically, to a system and method for monitoring vehicle dynamics to detect a slide event.

BACKGROUND OF THE INVENTION

Mining environments, particularly open pit surface mining environments, present unique challenges to maintaining proper operation of vehicles. The workhorse of a modern surface mine is a mine haul truck, which is a dump truck capable of hauling up to four hundred, and in some case over four hundred, tons of material. Haul trucks are some of the largest land vehicles ever built. As such, they are characterized by relatively slow acceleration and deceleration, and poor sight lines on every side of the vehicle. In particular, the rear and side opposite to the operator's cabin of a mine-haul truck can present enormous blind spots for the haul truck operator.

Over the course of normal mine operations, a haul truck can be expected to travel throughout the mining facility to carry out specific functions. In one example of conventional pit mining operations, material that is blasted from a rock face is loaded into a haul truck by a large shovel. The haul truck then transports this excavated material to a different area of the mining facility for processing by a crusher. Processed material may then be transported to another area of the mine for commercial offloading. Waste from the mine, such as soil and rock removed to gain access to ore, must also be removed to prevent impeding further mining operations. Often these processes of loading and transporting the material throughout the mining facility tend to be a rate-limiting step in the operating process of a mine. To overcome this many haul trucks are in operation simultaneously in order to facilitate continuous engagement in the transportation of materials. A delay or impediment to haul truck operations can cause disruptions to the whole transport process, particularly if it is due to infrastructure problems, such as the haul truck roads.

Haul truck roads are a critical component of the transportation of mining materials. Due to the nature of the mining enterprise, haul roads are not necessarily permanent fixtures within the facility. As the size of the mine expands or operations shift to different areas of the facility, haul roads can be modified to accommodate these changes. This can include altering routing and building or rebuilding new sections of roads. Even with well-planned design and construction, haul roads require continual monitoring and maintenance for optimal operation. Underperforming truck operation along haul roads can contribute to loss of productivity in a number of ways. It can cause delays in the transportation of material within the mine, and cause stress to the components of the haul truck, reducing longevity and increasing maintenance cost.

Because vehicles such as haul trucks are so massive, they have large turning radii and slow braking capabilities, making maneuvering the vehicles along haul roads relatively difficult. This can be exacerbated by slip events, where a loss of traction or stability due to wheel slip, over- or understeer, can lead to a temporary loss of control of the vehicle. Over- and understeer situations are characterized by times when the direction of vehicle travel does not align with its heading, or direction the vehicle is facing. This can worsen the sluggish maneuverability of the vehicle and in extreme cases, cause a loss of control. The massive size and weight of haul trucks means that inefficiencies in their operation, such as correcting for slip-events or vehicle recovery in the event of an accident, can cause appreciable monetary cost.

DETAILED DESCRIPTION OF THE INVENTION

Mine haul trucks are massive vehicles capable of transporting hundreds of tons of rock, ore, and other material throughout a mining facility. The incredible size of these vehicles and weight of their payloads can limit their maneuverability, acceleration and deceleration, and sight lines of the area around the vehicle. A haul truck is operated along specially built roads within the mining facility. These roads may not be permanent fixtures and are generally not built to highway standards. As such, the roads are subject to new or alternate routing and continual maintenance or modification as needed to facilitate mining operations. The transport of material within the mining environment is often a rate limiting step, and therefore haul truck efficiency is a premium. Large turning radii and slow braking capabilities due to the sheer size of these vehicles makes maneuvering along haul roads relatively difficult. Any delays due to suboptimal vehicle operations, vehicle or road maintenance, or repairing vehicle damage can cause appreciable cost increases. Preventing incidents where control of the vehicle may become compromised, such as the loss of traction or stability experienced in slip events, is therefore of utmost importance.

In various cases, a cause of a slip event could be related to construction features of the haul road, such as gradation, incline, curvature, or other parameters. Weather conditions, haul truck characteristics such as size or tire condition, or operator abilities could also play a role in causing slip events. It is therefore important to determine which vehicles are experiencing slip events and where and when they are occurring in the mining facility. With this information it may be possible to troubleshoot the root cause of these events.

Figure 1:
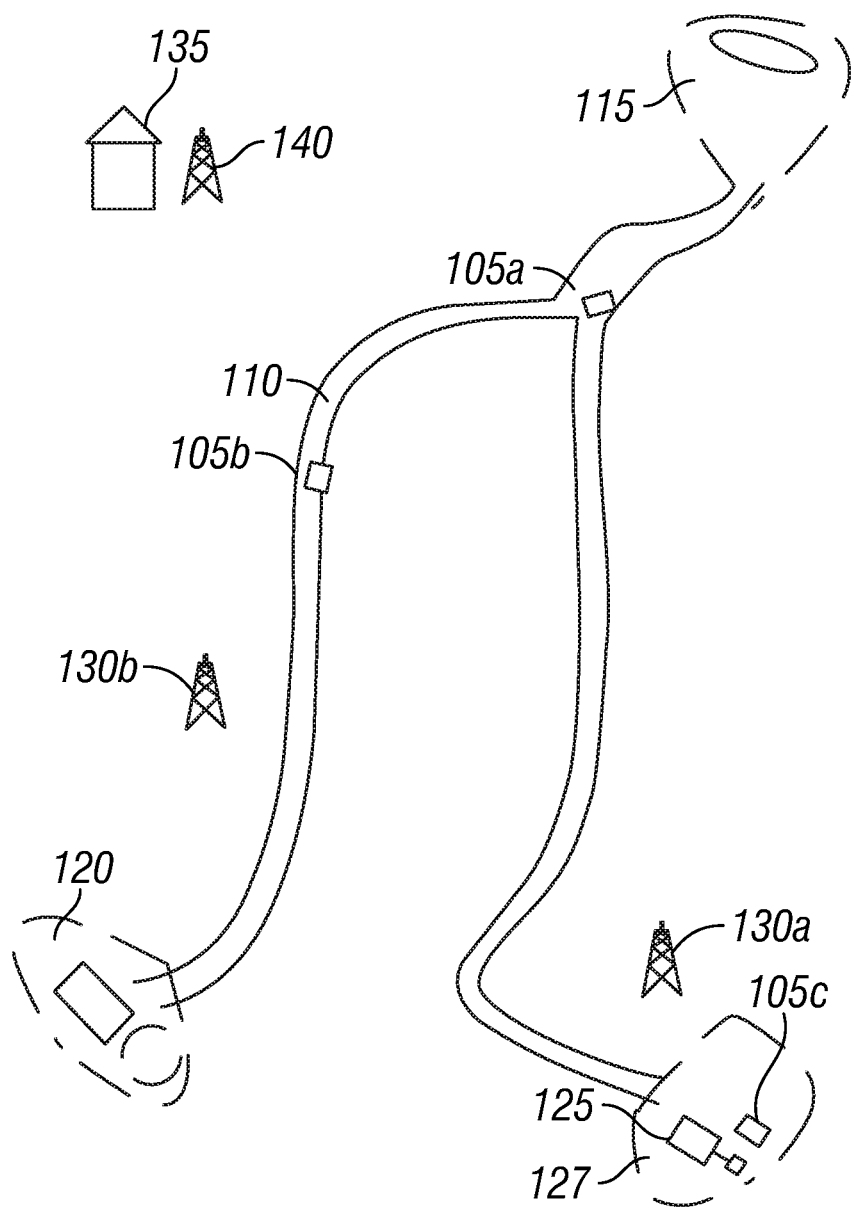
FIG. 1 illustrates an example layout of an open pit mining environment with a network of haul truck roads.

FIG. 1 is an illustration of an open pit mining environment where the systems and methods according to embodiments described herewith may be implemented. In the environment of FIG. 1, a plurality of mine haul trucks 105a-c operate on a mine haul route network 110. Mine haul trucks 105a-c perform hauling tasks, for example, by moving material between a shovel site 125, a crusher site 120 and a dump or stockpile site 115. The haul route as depicted in FIG. 1 is an example of possible road networks built within the mining facility. Building surface mine haul roads may take into account aspects of highway engineering, such as sloped inclines, banked curves, adequate drainage, and road gradation. In practice, these roads are often crude, by highway standards, due to the nature of the mine environment and operations. As the mine excavates earth, the depth and breadth of the mine itself grows. Haul routes must therefore grow with the mine. This means haul truck roads are evolving and changing as needed to facilitate the transport of material around the mine, necessitating constant monitoring for maintenance and safety considerations.

Each mine haul truck 105a-c is equipped with an array of navigation, communication, and data gathering equipment that assist the haul truck's operator. Each mine haul truck is equipped with a mobile computing device, for example, a tablet personal computer, a personal digital assistant, or a "smart phone" that may be used to implement the present system. The mobile computing device includes the basic functionality common to all computing devices, specifically, data processing, storage, input and output devices like displays, speakers and either dedicated or on-screen keyboards, and network communications interfaces. Mine haul trucks are also equipped with antennas or similar sensor equipment configured to share data with Global Positioning System (GPS) receivers for the purpose of gathering information about the time-varying position of the truck. Additionally, or alternatively, these antenna or similar devices may communicate with geolocation receivers located terrestrially within the mining environment. The position data and other information from the GPS and/or geolocating receivers may be shared with a computing device onboard the vehicle, as well as a mine-wide communications network 130a, 130b, 140 that communicates with other vehicles 105a-c or structures 135 within the mining facility, such as can be seen in the example in FIG. 1. These GPS and geolocating components form the backbone of the vehicle positioning system.

Through accurate monitoring of vehicle dynamics during normal operation within the mine environment, the loss of productivity from slip events may be mitigated. One example of this uses GPS or other geolocation technology to track the location and movements of haul trucks along the roads.

Figure 2:
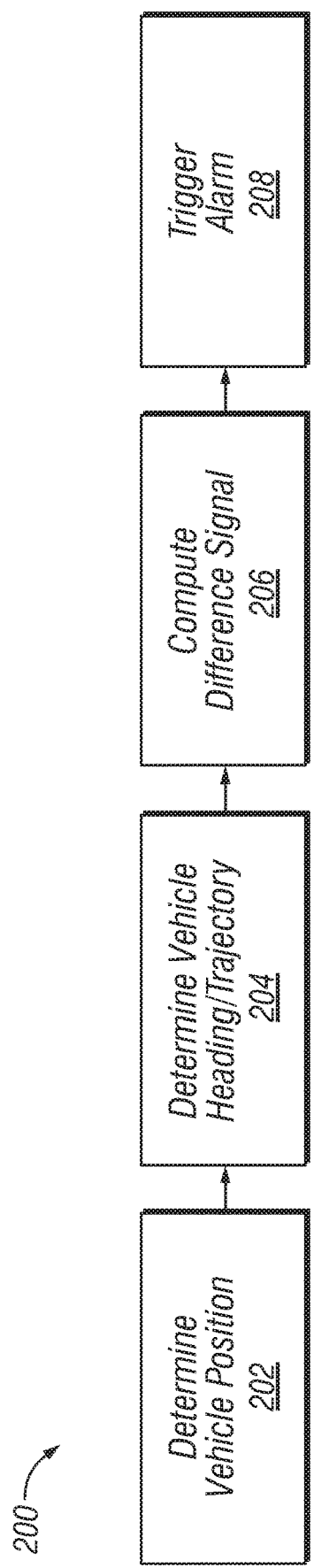
FIG. 2 is a flowchart illustrating a method for detecting slip events in an example embodiment of the present system and method.

FIG. 2 shows a flowchart illustrating the generalized steps in an example implementation 200 of this solution. In step 202, a vehicle positioning system uses antennas or similar sensors to send information about their location to a receiver or controller that determines the vehicle's position. Embodiments of the invention provide for using GPS or other geolocation technology to monitor the position of haul trucks during operation at the mining facility. Specifically, embodiments of the invention use multiple location sensors mounted to the vehicle to provide multiple data points about vehicle position. The multiple sensors are each configured to continuously stream data about their own respective locations within the mine environment. Since the data is continually streaming it is possible to determine where and how the sensor locations are changing over time. Because the sensors are mounted in known positions on the haul trucks, the location and orientation of the truck can thereby be computed.

Figure 3:
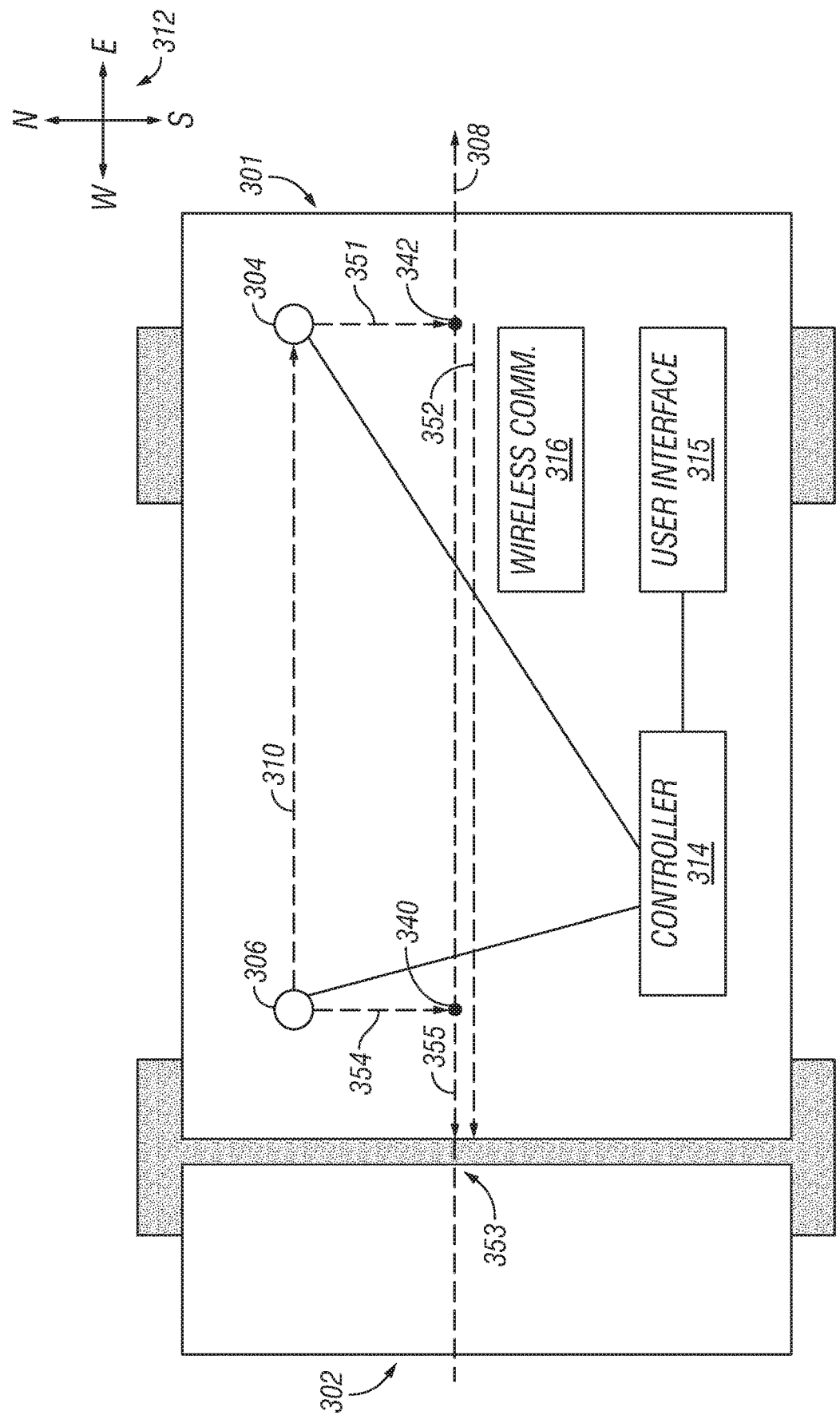
FIG. 3 is an example diagram showing a vehicle and system components enabling determination of the vehicle's heading vector.

In step 204, after the vehicle position data is captured, the heading and trajectory of the vehicle are determined using the vehicle position data received in step 202. For example, FIG. 3 depicts a vehicle configuration in which two location sensors 304 and 306 are mounted. Each of location sensors 304 and 306 is configured to determine its own location within the mining environment and provide that location data to controller 314, which may be mounted within vehicle 300. Because the location of each of location sensors 304 and 306 are known, the location data generated by each sensor can be used to determine a corresponding position and orientation of vehicle 300 as it changes over time. For example, sensor 304 has a known centerline offset (arrow 351) from centerline 308 of vehicle 300. Additionally, sensor 304 has a known geometrical offset (determined by arrows 351 and 351) from a center of rotation of vehicle 300, which in this example equates to a center of a rear axle of vehicle 300 (indicated by point 353). Similarly, sensor 306 has a known centerline offset (arrow 354) from centerline 308 of vehicle 300. Additionally, sensor 306 has a known geometrical offset (determined by arrows 354 and 355) from a center of rotation of vehicle 300, which in this example equates to a center of a rear axle of vehicle 300 (indicated by point 353).Different vehicles may have different centers of rotation. As discussed above, the center of rotation of some vehicles may occur at the center of the vehicle's rear axle. In other vehicles, however, (e.g., articulated trucks, small trucks) the center of rotation may be in a different location. In general, the center or rotation for a particular vehicle will be a point occurring along the center of the vehicle's axis of rotation. The axis of rotation for a vehicle undertaking a constant-radius turn is both perpendicular to the length of the vehicle and in-line with a center point of the circle defined by the vehicle's circular constant-radius turn. Typically, the center of rotation is defined as a point on the vehicle's axis of rotation located towards a center of the vehicle (e.g., a point also occurring on line 308 of FIG. 3).

FIG. 3 generally illustrates a system configured to determine a heading of vehicle 300 from data captured from GPS or geolocation sensors 304, 306 located at the front 301 and rear 302, respectively, of the vehicle 300.

In this example, the vehicle heading is the direction the front 301 of the vehicle is facing; i.e.: it is the direction the longitudinal axis 308 of vehicle 300 is pointing. In this example illustration, the vehicle heading is due east, according to compass rose 312. In this system, the known configuration of the position of sensors 304 and 306 on the vehicle (by virtue of known geometrical offsets from centerline 308 and center of rotation 353 indicated by combinations of arrows 351, 352, 354, and 355) is used to determine the heading, or direction the nose of vehicle 300 is pointing. In one embodiment, the heading is computed by calculating a vector formed between sensors 304 and 306 of vehicle 300. The system controller determines the geospatial location of each of the sensors (and therefore, the corresponding location of vehicle 300) at a particular time and computes the straight-line axis 310 between them. Using the known locations of the sensors, the geospatial direction of the straight-line axis 310 between them can be determined. Because the position of the sensors on the vehicle is known, the relationship between the straight-line axis 310 formed by the line between the sensors and the longitudinal axis 308 of the vehicle can be computed by the system controller 314. The geospatial direction of the longitudinal axis 308, the vehicle heading, can then be expressed in nomenclature such as the cardinal directions (North, South, East, West), degrees of a circle, or another chosen navigational system. In the example illustrated in FIG. 3, the straight-line axis 310 between the sensors is parallel to the longitudinal axis 308 of the vehicle. This relative relationship may change based on vehicle geometry or sensor mounting locations.

Figure 4:
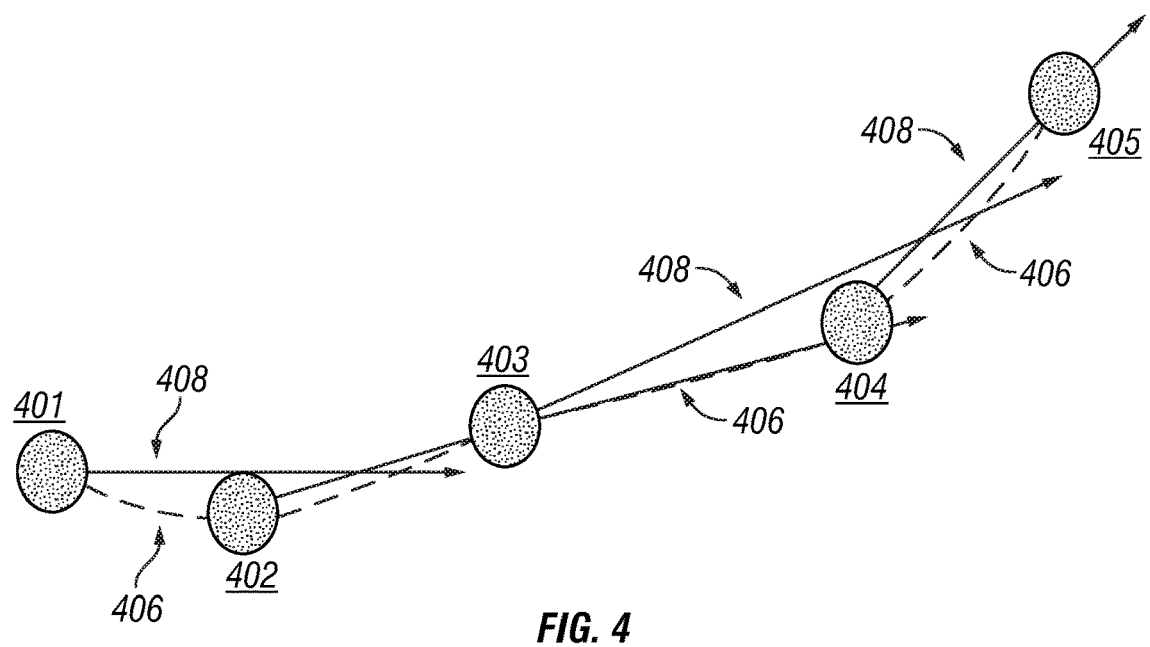
FIG. 4 is a figure illustrating how a trajectory vector of a vehicle may be determined using positional data from sensors in an embodiment.

The trajectory of the vehicle is the vector corresponding to the direction of travel of vehicle 300. In one embodiment, the trajectory is determined using the sensor locations and how they are moving in space (e.g., within the mining environment) over time. The system controller records a sequence of positional data points from the GPS or geolocation sensors located on the vehicle. An example of this process for a single sensor is illustrated in FIG. 4. At each particular time, the controller records the location 401-405 of a sensor (e.g., one of sensors 304 or 306 depicted in FIG. 3) at particular moments of time. Each incrementally recorded positional data point is used to create a sequence of positions that represents the path 406 of the sensor over time. The positional data points represent discrete moments in time, and therefore the actual path of movement is discontinuous. An algorithmic method may use the sequence of positions to approximate the pathway between individual positional data points and determine the trajectory 408 of the sensors. When the sensors are mounted in known locations on a haul truck (such as in the case of sensors 304 and 306 of FIG. 3), the recorded positional data from the sensors can be used to determine the location and movement of the haul truck. The system controller 314 or other computational device could therefore be able to determine the trajectory of the vehicle at given time increments using a differencing algorithmic method. One such example of an algorithm is the median filtered differencing method. Applying the median filtered differencing method to a series of data points, representing geospatial locations as determined by the aforementioned sensors, generates a trajectory vector for the sensor movement. From this trajectory determination and the known configuration of sensor positions relative to the truck, the controller is able to determine a linear vector corresponding to the truck trajectory. In one example implementation, this trajectory vector could be defined to lie tangent to the path of the center of the vehicle's rear axle, i.e.: the center of the vehicle's rear axle could be defined within the system to represent the vehicle as a whole. This may be beneficial as the center of the vehicle's rear axle may be equivalent to a center of rotation of the vehicle as the vehicle undergoes a turn. By using the center of the rear axle (and, specifically, the center of rotation of the vehicle) as the location of the vehicle, during a normal turning activity (i.e., with no excessive sliding) the vehicle's heading and trajectory vectors will be parallel to one another at all times.

These two vectors, vehicle heading and trajectory, are not always aligned during operation of the vehicles, and in such cases it can mean the vehicle heading is not aligned with the direction of travel. This misalignment can occur during periods of over- or understeer or wheel slip from loss of traction.

Figure 5:
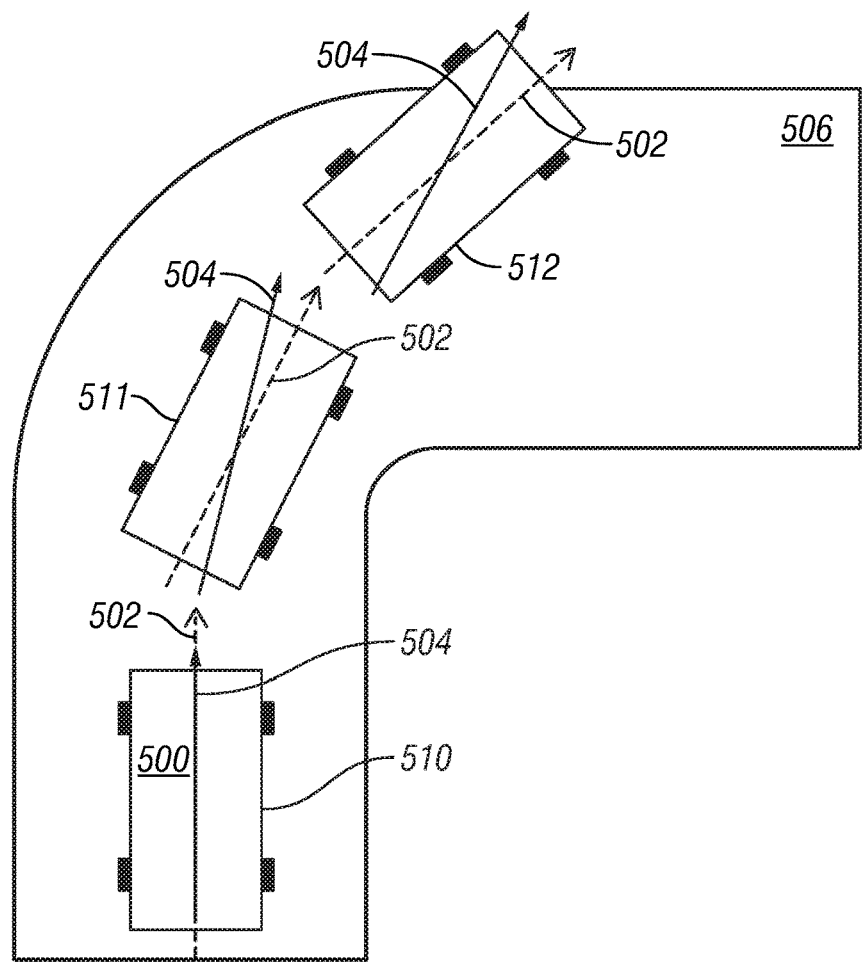
FIG. 5 illustrates an example of how heading and trajectory vectors of a vehicle can deviate during vehicle operation.

FIG. 5 shows an example of a vehicle 500 with example heading 502 and trajectory 504 vectors as vehicle 500 travels through a curved section of road 506. As depicted in FIG. 5, vehicle 500 is shown in three sequential instants in time 510-512 making a right turn through a curved portion of roadway. Initially (510) the vehicle approaches the curve from a straight line where the heading and trajectory are approximately aligned. In the second instance (511) the vehicle is entering the curve. Here the trajectory 504 of the vehicle shows a deviation from heading 502. The trajectory vector 504 is pointed nearly vertical, while the heading of the vehicle is pointed in the direction of the exit of the curve. In the third instance (512) this deviation has grown, and the vehicle appears to be leaving the roadway. In this illustration, the vehicle is moving along the direction 504 despite facing in a direction 502 that deviates from that by some degree. A situation such as this can be caused by complex interaction of vehicle dynamics, such as centripetal force, friction force of the tires with the road, and factors such as the center of mass or weight distribution of the vehicle, roadway conditions, or other factors. In extreme cases, the operator may temporarily lose control of the vehicle.

In one embodiment of this invention it is possible to detect these misalignments during vehicle operation by computing the difference in heading and trajectory. Returning to FIG. 2, in step 206, of implementation 200, therefore, the angular difference, or difference signal, between the heading and trajectory of the vehicle is determined by the controller (e.g., controller 314 of FIG. 3). This difference is calculated as the absolute angle deviation between the two vectors as determined by the positioning system sensors. The controller continually monitors the difference angle between vectors and uses the value of this angular deviation, the difference signal, to detect slip events or other changes in vehicle dynamics. In some instances, it may be necessary to apply a smoothing algorithm to the difference signal. This may be the case if the quality of the heading or trajectory data is compromised, such as if there are interruptions in data transmission or other errors that may induce noise to the calculation of the difference signal. This smoothing algorithm, such as exponential smoothing, may not materially change the result of the difference signal, but could remove any spurious measurements from imprecise data. The difference signal, which represents the angular deviation in the heading and trajectory vectors, could be displayed or plotted in a number of ways for tracking and monitoring purposes.

Figure 6:
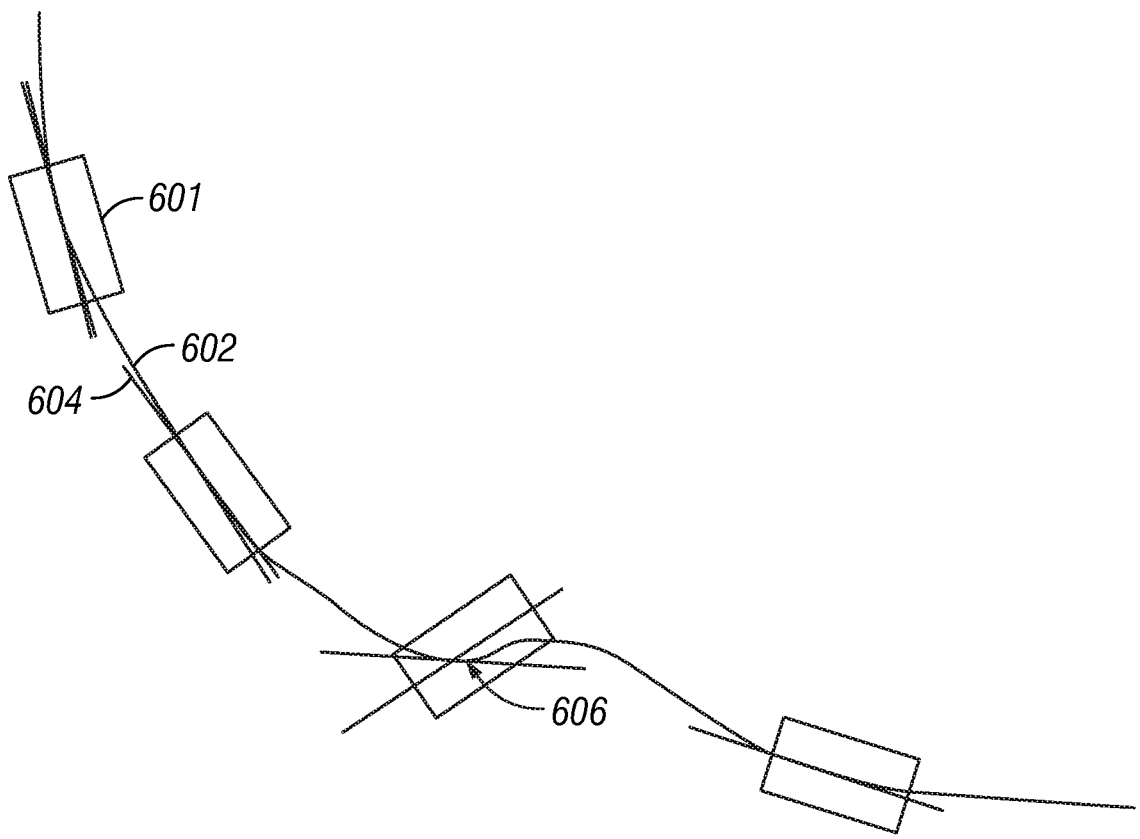
FIG. 6 is a diagram depicting an example of how heading and trajectory vectors may diverge in an example slip event.

In one example, once both the heading and trajectory for a haul truck are determined, it may be possible to use these values to monitor vehicle dynamics and create alerts for possible slip event conditions. FIG. 6 is an example illustration of a mining haul truck travelling on a route through the mine. As the truck 601 approaches the sharp curve, the trajectory vector 602 deviates from the heading vector 604. The deviation between these two vectors is greatest during the sharpest section of the curve in the road 606. This indicates that the truck 601 is moving almost parallel with the horizontal axis of the figure, though the orientation of the vehicle is approximately 45° from the horizontal. This large deviation could indicate a slip event, or oversteer. FIG. 6 is an example diagram of a sequence of events that could be displayed as a motion picture or graphic on a computer screen or other device for the vehicle driver or other mine personnel to monitor the relative movements of these axes for safety purposes.

Figure 7:
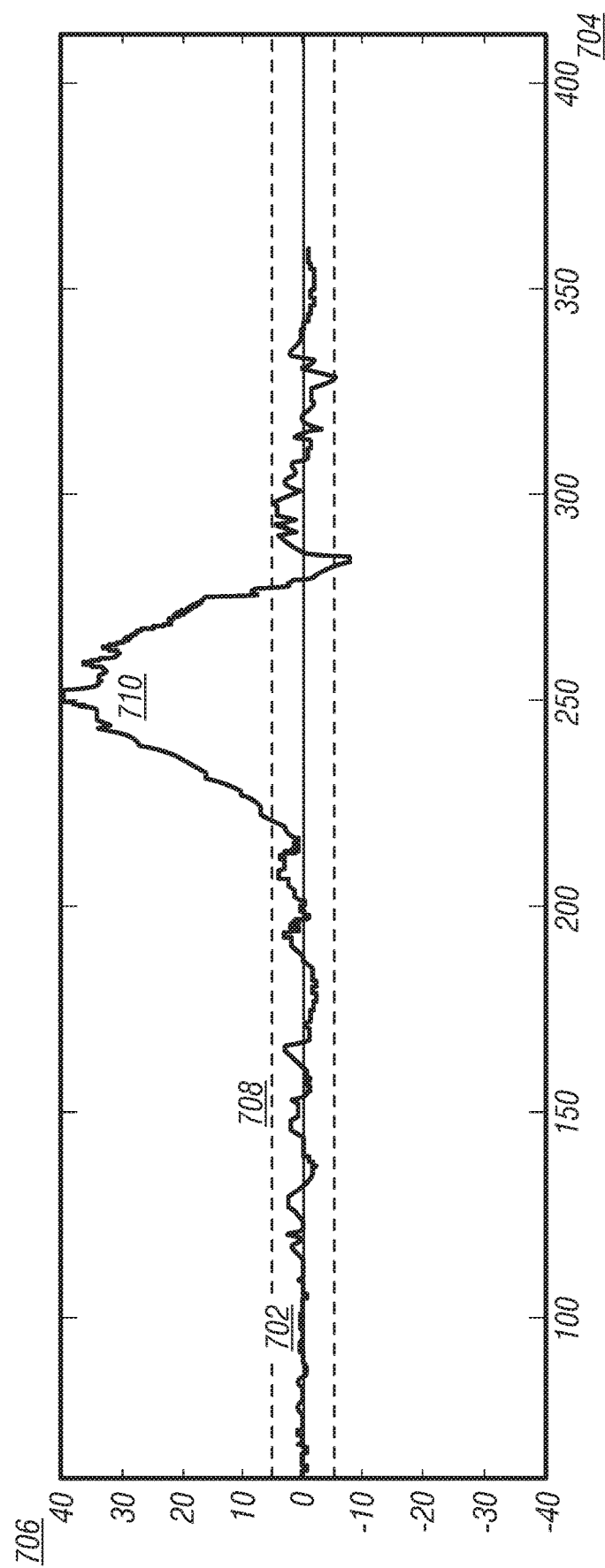
FIG. 7 is a graphical representation of how angular deviation may be compared with alarm thresholds in an example embodiment of this invention.

FIG. 7 is a graph that depicts the difference between a vehicle's trajectory and heading over time. The difference signal 702 in this figure is plotted as a line graph with time 704 as the x-axis and angular deviation 706, measured in degrees on the y-axis. This figure illustrates an example data set of what it may look like if a haul truck moving along a mine route experienced a slip event. The dashed lines 708 represent a deviation of 5 degrees in either direction. If the angular deviation between heading and trajectory exceed 5 degrees, the data will cross this dashed line, as can be seen in 710. Potential slip-event criteria based on a variety of parameters such as weather conditions, driver behavior, location within the mine, or other relevant factors that may affect vehicle dynamics can be used to determine if conditions exist that may make a slip event more probable. A more or less strict operating range for the difference signal may be chosen to reflect the relevant criteria to monitor for slip events. This operating range could be specified, for example, by the dashed lines 708 representing a 5 degree deviation. At 710, there is a large deviation between the heading and trajectory vectors of over 40 degrees. This means the direction of travel of the vehicle differs from the direction the vehicle is pointing by an amount that is beyond the operating range of plus or minus 5 degrees. By looking at the x-axis 704, it is possible to determine how long the difference signal was outside the operating range. The magnitude of this deviation indicates that the vehicle may have experienced a slip event, such as a loss of traction, over- or understeer while travelling along the mine route.

The criteria indicated by dashed lines 708 shown here are an example threshold. This criteria could be varied depending on a number of factors, at the discretion of mine personnel or others with the proper authority. Some factors that may affect the thresholds could be weather or road conditions within the mine, driver experience, truck specifications such as size and weight, road or truck maintenance schedules, historical slip event data, or other factors determined relevant.

When the threshold is crossed such a condition may trigger an alarm. Referring back to FIG. 2, in step 208, if the criteria or threshold have been met or exceed, the controller (e.g., controller 314) may take any appropriate action, including, for example, activating an alarm. Such action may include, for example, controller 314 activating or modulating an output of a user interface 315, which may include a light, display screen, or speaker. In an embodiment, the alarm may include a flashing light, to warn relevant parties, such as a driver (if the flashing light or other alarm is generated inside the cab of the vehicle) or drivers of other nearby vehicle (if the flashing light or other alarm is generated outside the cab of the vehicle) about the slip event. This could include the truck driver, mine supervisor(s), or other vehicle drivers. The difference signal threshold may vary based on various operating conditions, becoming stricter during periods where slide events may become more likely or potentially have more significant consequences, such as inclement weather. The criteria for triggering the alarm may vary as well, such as the duration of time the difference signal is outside the threshold. The alarm is cleared once the difference signal returns to a value within the operating range as determined by the criteria. The alarm, once triggered, may be a flashing light, noise, vibration, or other signal that serves to provide an alert about the difference signal being outside the threshold. The alarm may alert the driver within the cab of the vehicle, other haul truck drivers, supervisors, or any other people concerned with the operation of haul truck vehicles.

Figure 8:
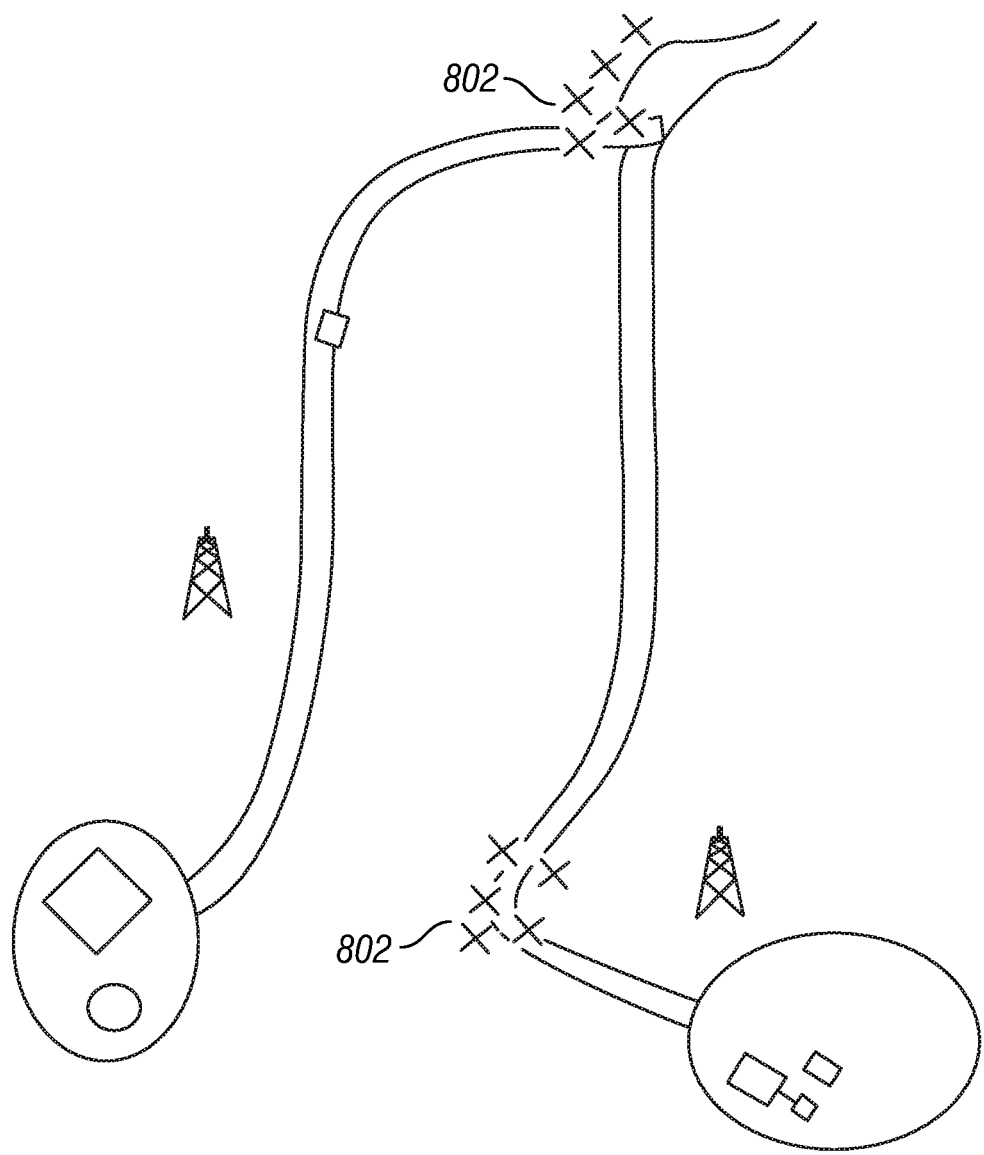
FIG. 8 is a schematic diagram of an example open pit mining environment with a network of haul truck roads and that illustrates how the invention could be used to mark problematic areas.

In one embodiment, the controller 314 may log incidents that trigger the alarm, including such parameters as vehicle location within the mining facility, heading and trajectory information, duration of alarm-triggering events, weather conditions, vehicle identification or other information deemed relevant. For example, with reference to FIG. 3, controller 314 may utilize a wireless communication system 316 (e.g., wifi or other IEEE 802.11 communication protocol, cellular, and the like) to transmit wireless data to a central mine dispatch system, where the data describes attributes of the detected slide event. In an example embodiment, this information may be used to create a database of information regarding slip events. This information could then be used to map problem areas on roads within the mining facilities or detect patterns of slip events with certain vehicles or driving behaviors. FIG. 8 shows an example map of the mine. Using historical data about slip events from the database, potential areas 802 where probability of an incident may occur could be marked on the map. This information about past slip events could be used for predictive modelling of slip events or as a warning for precaution to be taken when operating a haul truck in and around these areas. The database of slip events, which could include other information collected during historical slip events, could also be used for trouble shooting the root cause of these slip events. The information could be used for pattern recognition related to mine locations, driver or vehicle identification, weather, maintenance status, or other patterns that may contribute to increased risk of slip events.

Figure 9:
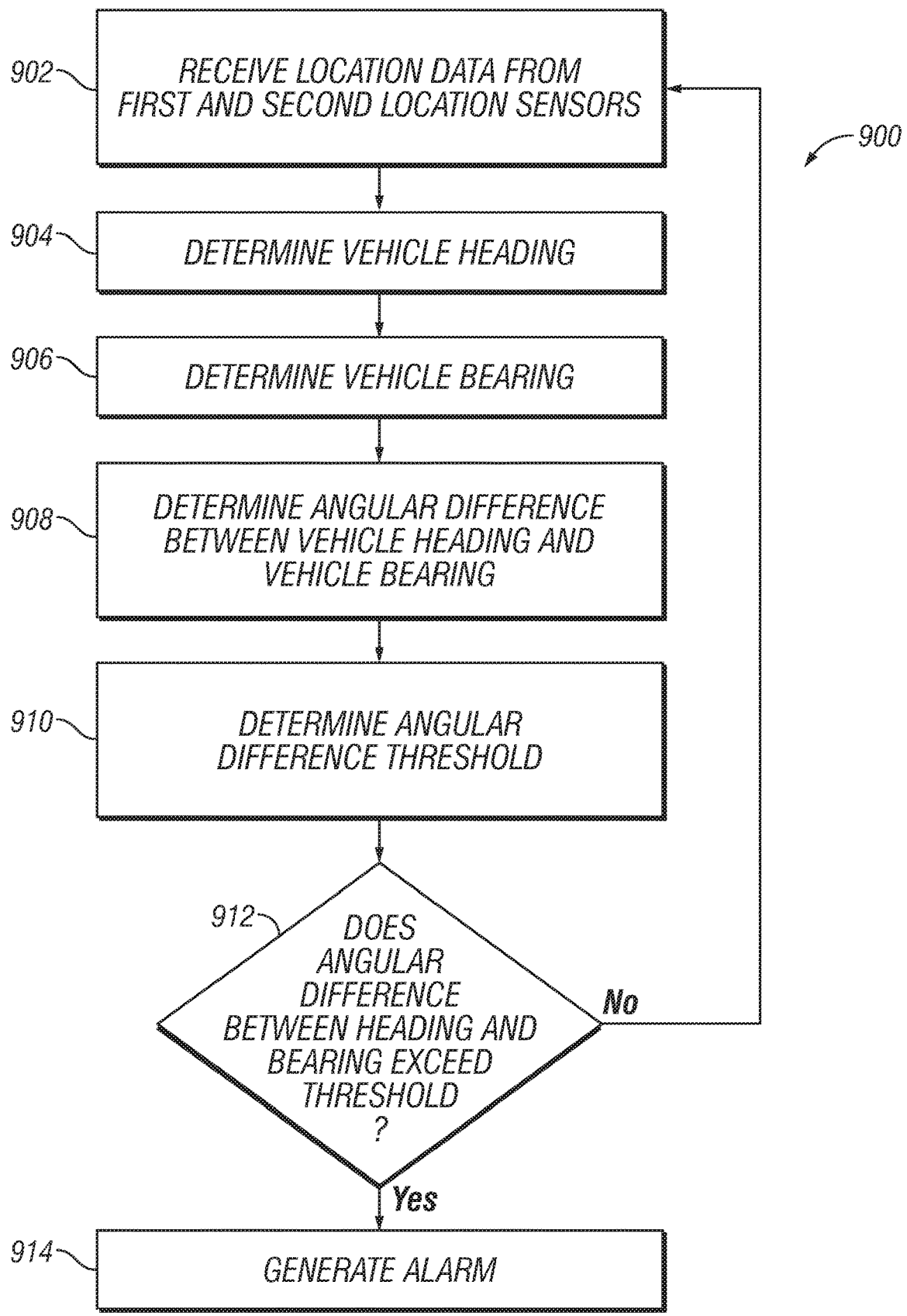
FIG. 9 is a flowchart depicting a method for slip detection in accordance with the present disclosure.

FIG. 9 is a flowchart depicting a method for slip detection in accordance with the present disclosure. The steps depicted in FIG. 9 may be implemented, for example, by controller 314 of vehicle 300 depicted in FIG. 3 in combination with the other system components depicted in FIG. 3. As such, method 900 is described in combination with references to the example system components depicted in FIG. 3.

In step 902, location data is received from both a first location sensor (i.e., sensor 306) and a second location sensor (i.e., sensor 304). Each sensor is mounted to the vehicle is a known location with respect to a center of rotation (i.e., point 353) of the vehicle, which may typically be a center of a rear axle of the vehicle.

In some embodiments, because the location data generated by each of the two sensors can be noisy, the location data received in step 902 may, to some degree, by smoothed by averaging out several points to come up with a more stable and reasonable location data over time. This filtering or smoothing could be done several ways, such as by filtering the location data generated by each sensor using a Kalman filter.

In step 904, a heading of the vehicle is determined. As described above, the heading refers to the direction in which the front of the vehicle is pointing and, in the case of a slide, may not correlate to the direction of actual travel of the vehicle. Both sensor 304 and sensor 306 have a known distance (indicated by arrows 351 and 354, respectively) from centerline 308 of vehicle 300. In this example, the centerline offsets of both sensors are the same. And, as such, the heading of vehicle 300 can be determined by mapping a vector (e.g., arrow 310) from the position of rear location sensor 306 to the position of front location sensor 304. Because each location sensor is the same distance from the vehicle's centerline, a vector drawn from the position of the rear location sensor to the front location sensor will run parallel to the vehicle's centerline and can therefore correctly indicate the heading (i.e., measured in degrees) of vehicle 300.

In other embodiments, the location sensors may not each be the same distance from the vehicle's centerline. In that case, to determine the vehicle's heading, a vector can be drawn between the locations of the location sensors and then the orientation vector can be adjusted based upon the relative positioning of the vehicle's location sensors to determine an accurate heading for the vehicle.

Having determined the heading of the vehicle, in step 906 the bearing of vehicle 300 is determined. As described herein, the vehicle's bearing describes the direction the vehicle is moving which, during a slide event, may not be the same as the vehicle's heading. In general, the vehicle's bearing is determined by determining how the vehicle is moving through space over time and, specifically, how the vehicle's location sensors in space (e.g., within the mining environment) move over time. Generally, controller 314 determines a sequence of positional data points for the vehicle over time, where the positional data points represent discrete moments in time, and therefore the actual path of movement is discontinuous. An algorithmic method may use the sequence of positions of the vehicle to determine the bearing of the vehicle.

In a specific embodiment, to determine the vehicle's bearing, controller 314 determines the path taken by a center of rotation of the vehicle over time. Specifically, in the present example, the center of rotation of vehicle 300 equates to the center of the vehicle's rear axle, or point 353. In order to determine the location of point 353, controller 314 utilizes the location data provided by one or both sensors 304 and 306.

To determine a location of the vehicle's center of rotation using location data received from sensor 306, controller 314 translates the location received from sensor 306 along arrow 354 in a direction perpendicular to arrow 310 (which was previously established in step 904) to the center line 308 of vehicle 300 and then along arrow 355 to point 353. Because the lengths of arrows 354 and 355 are known (due to the known placement of sensor 306 on vehicle 300), this enables controller to determine a location of the center of rotation of vehicle 300 using the location data received from sensor 306. In a similar manner, to determine a location of the vehicle's center of rotation using location data received from sensor 304, controller 314 translates the location received from sensor 304 along arrow 351 in a direction perpendicular to arrow 310 to the center line 308 of vehicle 300 and then along arrow 352 to point 353. Because the lengths of arrows 351 and 352 are known (due to the known placement of sensor 304 on vehicle 300), this enables controller to determine a location of the center of rotation of vehicle 300 using the location data received from sensor 304.

If controller 314 uses the location data from both sensors 304 and 306 to determine the location of the vehicle's center of rotation at a particular point in time, the two determined center of rotation locations (derived from the location data of the two different sensors) may be combined (e.g., averaged) to determine a single location for the vehicle's center of rotation at that point in time. In other embodiments, controller 314 may only use data captured from a single one of sensors 304 and 306 to determine a location of the vehicle's center of rotation.

Using this approach, the location of the vehicle (and, specifically, the location of the vehicle's center of rotation) can be determined over time using data generated by one or more of sensors 304 and 306 to generate a sequence of locations reflective of the actual movement of the vehicle 300. Then, using techniques described herein (e.g., mapping a vector from one of the locations to the next determined location in time) a bearing for the vehicle can be determined.

In step 908, with both the heading and bearing of the vehicle determined, controller 314 determines an angular difference between the determined heading and bearing. In step 910, controller 314 determines an angular difference threshold. As described herein, the angular difference threshold may be a fixed value (e.g., 5 or 10 degrees). In other embodiments, the threshold may be at least partially determined by a number of factors. For example, the vehicle's current speed may be used to scale the threshold determined by controller 314. When using the vehicle's speed, the threshold may be increased (requiring a greater deviation between heading and bearing to trigger slide detection) at lower speeds where the heading and bearing data may be less reliable and where slides are less likely. Conversely, the threshold may be decreased (requiring a smaller deviation between heading and bearing to trigger slide detection) at higher speeds where the heading and bearing data may be more reliable and where slides are more likely. In that case, the speed of vehicle may be used as a scaling factor in adjust the threshold. In some cases, other weighting factors beyond just speed may be utilized to determine the threshold value. For example, the vehicle's weight, time of day, weather conditions, and the like, could all be factors used to determine the applicable angular difference threshold.

Having determined the angular difference threshold, in step 912, controller 314 determines whether the angular difference between the vehicle's heading (determined in step 904) and the vehicle's bearing (determined in step 906) exceeds the angular difference threshold. In some embodiment, this comparison may further include determining whether the angular difference has exceeded the threshold for a minimum time duration. By requiring that the deviation exist for some minimum time duration, the likelihood that momentary inaccurate location data received from one or both of sensors 304 and 306 could trigger an alarm can be reduced. For example, if the angular difference between the vehicle's heading and the vehicle's bearing does not exceed the angular difference threshold, the method returns to step 902 and repeats so that the vehicle's bearing and heading can be consistently monitored for slide events.

But if the difference exceeds the threshold, in step 914 controller 314 determines that a slide has been detected and signals an alarm. The alarm may occur within the vehicle (so as to alert the vehicle's operator) such as by a suitable user interface (e.g., user interface 315) generating one or more of a visual, audible, haptic, or other alarm. In some cases, the alarm may also occur on the outside of the vehicle (e.g., via the flashing of a light mounted on an exterior of the vehicle or sounding of a siren) to alert individuals and other vehicle operators in the vicinity of the vehicle that the vehicle is undergoing a slide event.

In some embodiments, when a slide event is detected, controller 314 may also transmit data to a central mine dispatch computer system describe the slide event (e.g., vehicle location, magnitude of slide event, speed of vehicle at the time of the event, and the like) via a suitable communications network, such as wireless communication system 316. As described herein, such data may enable a centralized computer system to detect regions of the mining environment in which a relatively large number of vehicles are experiencing slide events. Upon detecting such a region, actions can be taken to modify the local roadway to reduce the likelihood of vehicles experiencing further slide events in that region.

In an embodiment, a system includes a first location sensor mounted to a mining haul truck. The first location sensor has a first known geometrical offset from a center of a rear axle of the mining haul truck. The system includes a second location sensor mounted to the mining haul truck. The second location sensor has a second known geometrical offset from the center of the rear axle and a third known geometrical offset from the first location sensor. The system includes a wireless communication system configured to transmit data to a central mine dispatch computer system, a display screen, and a controller in communication with the display screen and the wireless communication system. The controller is configured to determine a heading of the mining haul truck by mapping a first vector from a location of the first location sensor to a location of the second location sensor, and determine a bearing of the mining haul truck by determining a first location of the center of the rear axle using a first location data from the first location sensor and a second location data from the second location sensor, determining a second location of the center of the rear axle using a third location data from the first location sensor and a fourth location data from the second location sensor, and determining the bearing of the mining haul truck by mapping a second vector from the first location of the center of the rear axle to the second location of the center of the rear axle. The controller is configured to determine that an angular difference between the heading of the mining haul truck and the bearing of the mining haul truck exceeds a threshold angular difference indicating a slide event, generate an output at the display screen, wherein the output indicates that a slide event has occurred, and transmit a broadcast message, using the wireless communication system, to the central mine dispatch computer system indicating that a slide event has occurred. The broadcast message identifies a location of the mining haul truck.

In an embodiment, a system includes a first location sensor mounted to a vehicle, a second location sensor mounted to the vehicle, a user interface mounted to the vehicle, and a controller in communication with the user interface. The controller is configured to determine a heading of the vehicle using a first location data from the first location sensor and a second location data from the second location sensor, determine a bearing of the vehicle using at least one of the first location data from the first location sensor and the second location data from the second location sensor, determine that an angular difference between the heading and the bearing of the vehicle exceeds a threshold angular difference, and generate an output at the user interface, wherein the output indicates that a slide event has occurred.

In an embodiment, a method includes determining a heading of a vehicle using a first location data from a first location sensor mounted to the vehicle and a second location data from a second location sensor mounted to the vehicle, determining a bearing of the vehicle using at least one of the first location data from the first location sensor and the second location data from the second location sensor, determining that an angular difference between the heading and the bearing exceeds a threshold angular difference, and generating an output at a user interface mounted to the vehicle, wherein the output indicates that a slide event has occurred.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for example, comprise one or more physical or logical blocks of computer instructions which may, for example, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The schematic flow chart diagrams included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Where, "data storage media," or "computer readable media" is used, Applicants mean an information storage medium in combination with the hardware, firmware, and/or software, needed to write information to, and read information from, that information storage medium. In certain embodiments, the information storage medium comprises a magnetic information storage medium, such as and without limitation, a magnetic disk, magnetic tape, and the like. In certain embodiments, the information storage medium comprises an optical information storage medium, such as and without limitation, a CD, DVD (Digital Versatile Disk), HD-DVD (High Definition DVD), BD (Blue-Ray Disk) and the like. In certain embodiments, the information storage medium comprises an electronic information storage medium, such as and without limitation, a PROM, EPROM, EEPROM, Flash PROM, compactflash, smartmedia, and the like. In certain embodiments, the information storage medium comprises a holographic information storage medium.

Reference is made throughout this specification to "signals." Signals can be any time varying electromagnetic waveform, whether or not encoded with recoverable information. Signals, within the scope of this specification, can be modulated, or not, according to any modulation or encoding scheme. Additionally, any Fourier component of a signal, or combination of Fourier components, should be considered itself a signal as that term is used throughout this specification.

While one or more embodiments of the present invention have been illustrated in detail, the skilled artisan will appreciate that modifications and adaptations to those embodiments may be made without departing from the scope of the present invention as set forth in the following claims.

We claim:

1. A system, comprising:
a first location sensor connected to a mining haul truck;
a second location sensor connected to the mining haul truck, wherein the first location sensor and the second location sensor are both arranged along a common straight-line axis that is parallel to a longitudinal axis of the truck; and
a controller in communication with the first location sensor and the second location sensor, the controller being configured to:
determine a heading of the mining haul truck using the first location sensor and the second location sensor,
determine a first location of the mining haul truck at a first time using the first location sensor and the second location sensor,
determine a second location of the mining haul truck at a second time using the first location sensor and the second location sensor,
determine a bearing of the mining haul truck by mapping a vector from the first location to the second location,
determine that an angular difference between the heading of the mining haul truck and the bearing of the mining haul truck exceeds a threshold angular difference, and
generate an output indicating that a slide event has occurred.

2. The system of claim 1, wherein the controller is configured to:
determine a speed of the mining haul truck; and
determine the threshold angular difference using the speed of the mining haul truck.

3. The system of claim 1, wherein the output indicating the slide event has occurred is configured to activate a light disposed on an external portion of the mining haul truck.

4. The system of claim 1, wherein the system includes a display screen and the controller is configured to generate the output at the display screen by at least one of causing the display screen to output a visual display and causing the display screen to generate an audible output.

5. The system of claim 1, wherein the controller is further configured to process location data received from either the first location sensor or the second location sensor through a smoothing filter, the smoothing filter including a Kalman filter.

6. The system of claim 1, further comprising a wireless communication system configured to transmit data to a remote computer system and wherein the controller is further configured to generate the output by transmitting a message, using the wireless communication system, to the remote computer system indicating that the slide event has occurred, the message identifying a location of the mining haul truck.

7. A system, comprising:
a first location sensor mounted to a vehicle;
a second location sensor mounted to the vehicle;
a user interface mounted to the vehicle; and
a controller in communication with the user interface, the controller being configured to:
determine a heading of the vehicle in a vehicle forward/rearward direction using the first location sensor and the second location sensor, wherein the first location sensor and the second location sensor are arranged along a common axis parallel to a linear heading of the vehicle,
determine a bearing of the vehicle using at least one of the first location sensor and the second location sensor in the vehicle forward/rearward direction,
determine that an angular difference between the heading and the bearing exceeds a threshold angular difference, and
generate an output at the user interface, wherein the output indicates that a slide event has occurred.

8. The system of claim 7, further comprising a wireless communication system configured to transmit data to a remote computer system and wherein the controller is configured to transmit a message, using the wireless communication system, to the remote computer system indicating that the slide event has occurred, the message identifying a location of the vehicle.

9. The system of claim 7, wherein the controller is configured to determine the heading of the vehicle by mapping a first linear vector from a first location value determined by the first location sensor to a second location value determined by the second location sensor.

10. The system of claim 7, wherein at least one of the first location sensor and the second location sensor has a known geometrical offset from a center of rotation of the vehicle and the controller is configured to determine the bearing of the vehicle by:
determining a first location of the center of rotation at a first time using at least one of the first location sensor and the second location sensor,
determining a second location of the center of rotation at a second time using at least one of the first location sensor and the second location sensor, and determining the bearing of the vehicle by mapping a second linear vector from the first location of the center of rotation to the second location of the center of rotation.

11. The system of claim 10, wherein the center of rotation of the vehicle is an axis running through a center of a rear axle of the vehicle.

12. The system of claim 11, wherein one of the first location sensor and the second location sensor is located directly over the center of the rear axle.

13. The system of claim 7, wherein the controller is configured to
determine a speed of the vehicle; and
determine the threshold angular difference using the speed of the vehicle.

14. The system of claim 7, wherein the controller is configured to generate the output at the user interface by at least one of causing the user interface to output a visual display and causing the user interface to generate an audible output.

15. The system of claim 7, wherein the controller is further configured to process location data received from either the first location sensor or the second location sensor through a smoothing filter, the smoothing filter including a Kalman filter.

16. A method, comprising:
determining a heading of a vehicle based on a position of a first location sensor mounted to the vehicle relative to a second location sensor mounted to the vehicle and positioned along a common longitudinal axis;
determining a bearing of the vehicle based on a latitudinal offset of the first location sensor relative to the second location sensor;
determining that an angular difference between the heading and the bearing exceeds a threshold angular difference; and
generating an output at a user interface connected to the vehicle, wherein the output indicates that a slide event has occurred.

17. The method of claim 16, further comprising transmitting a message, using a wireless communication system, to a remote computer system indicating that the slide event has occurred.

18. The method of claim 17, further comprising encoding into the message an indication of the angular difference between the heading and the bearing of the vehicle.

19. The method of claim 16, wherein determining the heading of the vehicle includes mapping a first vector from a first location value from the first location sensor to a second location value from the second location sensor.

20. The method of claim 16, wherein the first location sensor has a first known geometrical offset from a center of rotation of the vehicle and the second location sensor has a second known geometrical offset from the center of rotation and further comprising:
determining a first location of the center of rotation at a first time,
determining a second location of the center of rotation at a second time, and
determining the bearing of the vehicle using the first location and the second location.

* * * * *